US010822752B2

(12) United States Patent
Wu

(10) Patent No.: US 10,822,752 B2
(45) Date of Patent: Nov. 3, 2020

(54) THERMOPLASTIC CELLULOSIC FIBER GRANULES USEFUL AS INFILL MATERIALS FOR ARTIFICIAL TURF

(71) Applicant: Qinglin Wu, Baton Rouge, LA (US)

(72) Inventor: Qinglin Wu, Baton Rouge, LA (US)

(73) Assignee: Board of Supervisors of Louisiana State University and Agricultural and Mechanical College, Baton Rouge, LA (US)

(*) Notice: Subject to any disclaimer, the term of this patent is extended or adjusted under 35 U.S.C. 154(b) by 179 days.

(21) Appl. No.: 15/736,148

(22) PCT Filed: Jun. 10, 2016

(86) PCT No.: PCT/US2016/037005
§ 371 (c)(1),
(2) Date: Dec. 13, 2017

(87) PCT Pub. No.: WO2016/205087
PCT Pub. Date: Dec. 22, 2016

(65) Prior Publication Data
US 2018/0179711 A1  Jun. 28, 2018

Related U.S. Application Data

(60) Provisional application No. 62/175,474, filed on Jun. 15, 2015.

(51) Int. Cl.
*E01C 13/08* (2006.01)
*C08L 1/02* (2006.01)

(52) U.S. Cl.
CPC ............... *E01C 13/08* (2013.01); *C08L 1/02* (2013.01); *C08L 2201/02* (2013.01); *C08L 2205/025* (2013.01); *C08L 2205/03* (2013.01); *C08L 2205/035* (2013.01); *C08L 2205/16* (2013.01); *C08L 2207/062* (2013.01); *C08L 2207/066* (2013.01); *C08L 2207/20* (2013.01); *Y10T 428/23921* (2015.04)

(58) Field of Classification Search
CPC .... E01C 13/08; Y10T 428/23921; C08L 1/02; C08L 2205/16; C08L 2207/066; C08L 2207/062; C08L 2201/02
See application file for complete search history.

(56) References Cited

U.S. PATENT DOCUMENTS

| | | |
|---|---|---|
| 2005/0003193 A1 | 1/2005 | Stroppiana |
| 2005/0123744 A1 | 6/2005 | Mohanty |
| 2008/0128933 A1 | 6/2008 | Przybylinski |
| 2010/0055461 A1 | 3/2010 | Daluise |
| 2011/0081506 A1 | 4/2011 | Lee |
| 2011/0263758 A1 | 10/2011 | Wu |
| 2012/0094107 A1* | 4/2012 | Spittle ............... E01C 13/08 428/304.4 |
| 2012/0108472 A1 | 5/2012 | Wu |
| 2012/0183705 A1 | 7/2012 | Chereau |
| 2012/0258811 A1 | 10/2012 | Tetrault |
| 2012/0263892 A1* | 10/2012 | Rodgers ............. A01G 20/00 428/17 |
| 2013/0078394 A1 | 3/2013 | Taylor |
| 2013/0310428 A1 | 11/2013 | Bartko |
| 2014/0322459 A1* | 10/2014 | Tetrault .............. E01C 13/08 428/17 |
| 2014/0374110 A1 | 12/2014 | Wu |
| 2019/0203425 A1* | 7/2019 | Sawyer ............. D06N 7/0086 |
| 2019/0242071 A1* | 8/2019 | Siekmann .......... D06N 7/0063 |
| 2019/0316303 A1* | 10/2019 | Siekmann .......... E01C 13/083 |
| 2019/0338472 A1* | 11/2019 | Nusca ................ E01C 13/08 |

FOREIGN PATENT DOCUMENTS

| | | |
|---|---|---|
| EP | 2206833 | 7/2010 |
| KR | 101163051 B1 * | 7/2012 |
| KR | 101164030 B1 * | 7/2012 |
| KR | 1684179 B1 * | 12/2016 |
| KR | 101764701 B1 * | 8/2017 |
| KR | 101770397 B1 * | 8/2017 |
| KR | 101773146 B1 * | 9/2017 |
| KR | 101913653 B1 * | 11/2018 |

OTHER PUBLICATIONS

KR 101770397B1 English translation by Google patents, 2017.*
KR 101764701B1 English translation by Google patents, 2017.*
KR 101163051B1 English translation by Google patents, 2012.*

* cited by examiner

*Primary Examiner* — Cheryl Juska
(74) *Attorney, Agent, or Firm* — John H. Runnels

(57) ABSTRACT

An artificial turf system has polymeric turf fibers resembling grass, and infill particles interspersed among said turf fibers. At least some of the infill comprises synthetic composite particles containing a thermoplastic polymer and cellulosic fibers, in which thermoplastic polymer is a matrix that binds together the other components of each synthetic particle into a composite particle.

14 Claims, No Drawings ical field, artificial turf provides a consistent, year-round, all-weather playing surface that can withstand extended use, without downtime for recovery of vegetation. As a landscape cover, artificial turf provides a low-maintenance, weed-free surface that does not need to be watered or fertilized. Most artificial turf systems have a multi-layer backing system, resilient "grass" blades made of polymer, and a granular filler or "infill" that is spread over the surface of the backing system up to a certain depth of the "grass" blades, to more nearly resemble natural turf and to provide additional resilience. Outdoor artificial turf systems also typically include a drainage layer underneath.

THERMOPLASTIC CELLULOSIC FIBER GRANULES USEFUL AS INFILL MATERIALS FOR ARTIFICIAL TURF

The benefit of the filing date of U.S. provisional application 62/175,474, filed 15 Jun. 2015 is claimed under 35 U.S.C. § 119(e) in the United States, and is claimed under applicable treaties and conventions in all countries.

TECHNICAL FIELD

This invention pertains to artificial turf systems using composite particles as infill materials.

BACKGROUND ART

Artificial turf is a synthetic, grass-like cover that replicates some features of natural grass. Artificial turf may be used indoors or outdoors. When used on athletic fields, artificial turf provides a consistent, year-round, all-weather playing surface that can withstand extended use, without downtime for recovery of vegetation. As a landscape cover, artificial turf provides a low-maintenance, weed-free surface that does not need to be watered or fertilized. Most artificial turf systems have a multi-layer backing system, resilient "grass" blades made of polymer, and a granular filler or "infill" that is spread over the surface of the backing system up to a certain depth of the "grass" blades, to more nearly resemble natural turf and to provide additional resilience. Outdoor artificial turf systems also typically include a drainage layer underneath.

More than 8,000 multi-use, synthetic turf sports fields are now used in North American schools, colleges, parks, and professional sports stadiums, and an even greater number are in use around the world. About half of all U.S. National Football League teams play on artificial turf. Since 2003, over 70 FIFA U-17 and U-20 World Cup matches have been played on artificial turf.

Many different granular infill materials have been used in artificial turf systems. The purpose of the infill materials is to keep the "grass" blades upright, to absorb shock, and to provide deformability. Infill materials currently in use include crumb rubber from scrap tires, EPDM (ethylene propylene diene monomer), organic fibers, pure or coated silica sand, and thermoplastic elastomers (TPE).

Some existing infill components have economic, environmental, or health and safety concerns. For example, sand is largely silica. Although larger silica particles are not toxic, the inhalation of fine silica dust can lead to health problems such as silicosis. Rubber from used tires contains many potentially toxic substances, such as polycyclic aromatic hydrocarbons (PAHs) and heavy metals. Some PAHs, such as benzopyrene, are known carcinogens. Heavy metals, such as lead, zinc, and cadmium, can be harmful if introduced to the environment through run-off from artificial turf fields. Thermoplastic elastomers (TPEs) and ethylene-propylene diene monomer (EPDM) are usually considered safe and nontoxic, but TPEs and EPDM are not widely available as recycled materials; and as virgin materials they are expensive. When used as infill, TPEs and EPDM are usually mixed with sand to reduce their cost, and the resulting mixture share the problems associated with silica sand.

Another approach to reducing costs is to incorporate "natural" organic materials into the infill, materials such as ground coconut, pecan shells, peanut shells, walnut shells, corn cobs, or hard "pit" materials such as olive stones. However, organic materials provide nutrients for microbial growth, and they can be attacked by termites. Over time organic materials tend to decompose. These materials can also present fire hazards.

Granules of thermoplastics such as polyethylene and polypropylene and their composites, incorporating an inorganic filler such as talc, mica, calcium carbonate ($CaCO_3$), silica ($SiO_2$), Wollastonite ($CaSiO_3$), clay, diatomite, titanium dioxide, or Zeolites, have been used as infill materials. Pure thermoplastic granules are relatively soft, they have low surface hardness (low Gmax value), and they have low heat-softening temperatures. Incorporating an inorganic filler into a polymer resin can help enhance the granule strength and increase the effective heat softening temperature. However, incorporating a high fraction of inorganic materials (e.g., above 50% by weight) makes it difficult to recycle the materials at the end of their service life. Also, moisture retention agents may be needed to keep the field at an optimally "moist" state to help with certain sporting actions such as sliding tackles.

US patent application publication 20100055461 discloses an artificial turf infill comprising an organic material such as ground walnut shells, in which the organic particles are coated with an anti-microbial agent. Water-retaining particles are added to the infill, ranging between 0 and 60% of total weight of the mixture. Synthetic, resilient granules preferably between approximately 20% and 25% by weight may be added to the infill to improve shock attenuation. The water-retaining particles and synthetic resilient granules are also coated with the anti-microbial agent.

In such a system, antimicrobial agents can leach from the coated particles as cracks develop, for example as a result of swelling and shrinking from wetting/drying or heating/freezing.

US patent application publication 20110081506 discloses an artificial turf including a pile fabric having a backing, pile elements extending upwardly from the backing, and an infill layer on the backing such that the pile elements are at least partially embedded in the infill layer. The infill layer includes an elastic infill and a high-hardness resin infill.

US patent application publication 20120183705 discloses a polymer-coated particulate material having a particulate substrate and an applied compound, wherein the applied compound coats at least 50% of the surface of the particulate substrate, and wherein, at the time of application, the applied compound includes a dispersion including a thermoplastic polymer and a stabilizing compound. The coated particulates could be used as infill materials for artificial turf.

There is an unfilled need for improved artificial turf systems, especially turf systems that employ infill materials that can be produced from recycled materials, that are nontoxic, that are resistant to degradation, and that may be used indoors or outdoors.

DISCLOSURE OF THE INVENTION

I have discovered an artificial turf system comprising polymeric, upright turf fibers resembling grass, and infill interspersed among said turf fibers. At least some of the infill comprises synthetic composite particles containing a thermoplastic polymer and cellulosic fibers, in which thermoplastic polymer is a matrix that binds together the other components into a composite particle. Optionally the composite particles can also include other components such as ultraviolet absorbers; blending agents such as coupling agents; biocides; and colorants. It is important that the components of the synthetic infill particles are combined into a composite material, and are not just a simple mixture of the components. A "composite" is an engineered, solid-phase material made from two or more constituent materials with significantly different physical or chemical properties, in which the constituents remain separate and distinct on a macroscopic level within the finished, solid-phase structure. It is preferred that the density of the synthetic composite particles should be greater than 1.0 gram/cm$^3$, to minimize any tendency for the infill particles to float away when the turf gets wet, for example during a storm or during cleaning with water.

The synthetic composite particles provide improved infill performance—e.g., improvements in one or more of the following characteristics: strength, resistance to ultraviolet light, thermal resistance, moisture resistance, resistance to biological attack, and material handling properties. The Thermoplastic Cellulosic-Fiber Granules (TCFG) material can be formed as pellets of various sizes through extrusion and optional further grinding of extruded materials—e.g., 10 to 5,000 microns across; optionally there can be a range of varying diameters or sizes in a mixture. A preferred range is 500 to 3000 microns across. The composition can be formulated to resist biological attacks (such as termites, mold, and wood-decay fungi) using environmentally friendly and leach-resistant biocides such as zinc borate; to resist fire using environmentally friendly and leach-resistant fire retardants such as magnesium hydroxide or zinc borate; and to resist UV degradation using UV retardants such as hindered amine light stabilizers or carbon black. The Young's modulus of the material can be controlled, for example over the range from 0.5 to 4.0 GPA, allowing the granules to have a selected deformability under pressure, or even a progressive deformability with a mixture having a range of Young's moduli. A preferred range is between 1 and 3 GPA. The infill materials do not require waste rubber particles. In preferred embodiments: they are fire-resistant; they are resistant to ultraviolet light; they are resistant to attack from bacteria, insects, and mold; they have low water retention; and they have high elasticity. The synthetic particle infill composites described here may be used in combination with any of the various types of synthetic turf known in the art.

In one embodiment, the particles comprise two-different shapes—particles that are approximately spherical (70% to 95% by mass); and longer particles with a narrower shape (5% to 30% by mass). The spherical particles have diameters between 0.3 mm and 3.35 mm, and aspect ratios less than 2; whereas the narrower particles have lengths between 5 and 20 mm, widths between 1 and 5 mm; thicknesses between 0.1 to 1.5 mm; and aspect ratios, the ratio of a particle's length (longest dimension) to the particle's thickness (shortest dimension), between 5 and 70. Spherical particles can sometimes be easier to produce by some methods, and serve as the primary infill in this embodiment. However, spherical particles alone can be too "slippery." To avoid having a field made of "ball bearings" with reduced traction, the narrower particles help inhibit rotation of the spherical particles, so the surface provides better overall traction.

The thermoplastic polymer matrix, the first component of the composite infill material, may comprise any virgin or recycled, common or engineering thermoplastic polymer, including for example one or more of the following: acrylonitrile butadiene styrene (ABS), polymethylmethacrylate (PMMA), acrylonitrile (AN), polytetrafluoroethylene (PTFE), polyvinylidene fluoride (PVDF), nylon 6, nylon 66, polycarbonate (PC), polybutylene terephthalate (PBT), polyethylene terephthalate (PET), polyetheretherketone (PEEK), polyetherimide (PEI), low density polyethylene (LDPE), high density polyethylene (HDPE), polyimide (PI), polyphenylene oxide (PPO), polyphenylene sulfide (PPS), polypropylene (PP), polystyrene (PS), polysulfone (PSO), polyethersulfone (PES), polyvinyl chloride (PVC), starch-based polymers, polylactic acid (PLA) plastics, poly-3-hydroxybutyrate (PHB), polyamide 11 (PA 11), bio-derived polyethylene, and mixtures of these polymers. The thermoplastic polymer provides a matrix that binds the cellulosic fibers and other components into a composite. For economic reasons, recycled materials are preferred, although virgin materials may also be used. Prior to making the composition the materials should preferably be in powder, pellet, or particulate form. Recycled plastic materials can be ground using plastic grinders to produce the required forms. A mixture containing both a common plastic (melting temperatures less than 200° C.) and an engineering plastic (melting temperature around 250-270° C.) as the matrix material can also be used as the base polymer composition. For example, some recycled plastics or plastic streams include a mixture of common and engineering plastics. For such a mixture a solid state extrusion process may be used to create a matrix from which an integrated material containing the two types of plastics can be produced. The thermoplastic polymer matrix can comprise from 10% to 90% of the composition as a whole.

The second component of the composite infill material comprises a cellulosic fiber or cellulosic particle material, including for example fibers, particles, or flakes from one or more of the following: softwood (e.g., southern pine), hardwood (e.g., maple, cypress, cedar, or oak), bamboo, rattan, rice straw, wheat straw, rice husk, bagasse, cotton stalk, jute, hemp, flax, kenaf, milkweed, banana trees, walnut shells, pecan shells, other tree nut shells, peanut shells, coconut shells, and any of the many other sources of cellulosic fibers and particles known in the art. The fibers provide rigidity, strength, and stiffness properties to the composition. The cellulosic material should preferably be in particulate, flake, or shaving form. The particle size may be between 10 and 15,000 microns. The cellulosic material can comprise from 10% to 80% of the composition as a whole.

A third, optional component of the composite infill material comprises one or more ultraviolet (UV) protectors. A UV protector can be, for example, a UV absorber or a hindered amine light stabilizer. UV protectors include, for example: carbon black, activated carbon, hindered amine light stabilizers, the Tinuvin™ light stabilizers/free radical scavengers such as Tinuvin™ 783 and Tinuvin™ 326, the Chimassorb™ light stabilizers/free radical scavengers such as Chimassorb™ 944 and Chimassorb™ 90, benzophenones, and benzotriazoles. The optional ultraviolet protector can comprise from 0% to 10% of the composition as a whole.

A fourth, optional component of the composite infill material comprises one or more biocides, for example selected from the group consisting of zinc borate; calcium borate; boric acid; and copper, zinc, or silver, for example copper-, zinc-, or silver-based micro/nano-particles. A preferred biocide is zinc borate. The biocides (and for that matter, all components of the composite) are preferably resistant to leaching into aqueous solution. The optional biocide can comprise from 0.1% to 10% of the composition as a whole. Compounds that might otherwise be too water-soluble can be stabilized against leaching by absorption onto and into the cellulosic fibers.

A fifth, optional component of the composite infill material comprises one or more minerals, for example selected from one or more of oyster shell, other sources of calcium carbonate, mica, talc, barite, ceramics, or their mixtures. The mineral additives provide additional strength and stiffness to the composite. They also help increase the material density, and can help reduce overall cost. The particle size may be between 10 and 5000 microns. The optional minerals can comprise from 1% to 50% of the composition as a whole. More than 40% by weight minerals is not preferred.

A sixth, optional component of the composite infill material comprises one or more bonding or modifying agents to promote bonding between cellulosic materials and polymer: for example selected from one or more of the following: stearic acid, organo-titanates (e.g., Ken-React LICA 09), maleated ethylenes, maleic anhydride, styrene/ethylene/butylene/styrene block copolymer (SEBS), ethylene/propylene/diene terpolymer (EPDM), ethylene/octene copolymer (EOR), ethylene/methyl acrylate copolymer (EMA), ethylene/butyl acrylate/glycidyl methacrylate copolymer (EBAGMA), poly(ethylene-co-methacrylic acid), Surlyn ionomers, maleated ethylene/propylene elastomers (EPR-g-MAs), colorants and other additives. The optional polymeric bonding or modifying agents can comprise from 0.1% to 20% of the composition as a whole.

A seventh, optional component of the composite infill material comprises one or more fire retardants, for example selected from the group consisting of: inorganic compounds such as aluminum trihydroxide, magnesium dihydroxide, ammonium polyphosphate, zinc borate, and antimony trioxide; silicon-containing compounds such as silicon dioxide, silsesquioxanes, silicon nanoparticles, silicon nanofillers, montmorillonite clays, other silicon-containing clays; organic phosphorous compounds such as triphenylphosphate, halogenated phosphorous compounds, and ammonium polyphosphate; halogenated organophosphorus compounds including brominated, chlorinated, and fluorinated organic compounds; nitrogen-based compounds such as melamines; nanocompounds including montmorillonite clays, carbon nanotubes, alumino-silicates, boroxiloxanes, organoclays, and other fire-retardant compounds such as zinc chloride, expandable flake graphite intercalations, ammonium borate, ammonium sulphate, ammonium chloride, boric acid, and sodium borate. Preferred fire retardants include magnesium dihydroxide and zinc borate. The optional fire retardant can comprise from 1% to 50% of the composition as a whole. Small amounts of clays can also help enhance particle strength.

The ingredients employed to make the composites may be purpose-made, or they may be virgin materials. Alternatively, they may be formed by crushing or grinding composite materials that contain suitable components, and that may have originally been manufactured for a different purpose, e.g., building materials such as wood-polymer composites, particleboard, fiberboard, and other types of engineered wood. Wastes may be used for this purpose (e.g., sawdust or scraps), or older materials may be recycled for use in the invention, rather than being discarded.

The infill materials are not merely mixtures of their components. Rather, they are composite materials. (Simple mixtures optionally may also be present, in addition to the composites, although it is preferred to use composites alone.) The composites may be prepared through techniques otherwise known in the art for making composite materials. One such method is melt compounding, for example using intermesh, counter/co-rotating, twin-screw extruders. The materials in the formulation are metered and fed to the extruder at an appropriate temperature. The extrudates are preferably quenched in a cold water bath or in air; and then they may be pelletized or ground into granules of suitable sizes. Another technique is to make a blend with a high-speed kinetic mixer (e.g., a mixer manufactured by LEX Technologies, Brampton, Ontario, Canada and supplied by EcoLEX, Inc of Burlington, Ontario), followed by grinding to produce desired particle sizes.

Melt compounding is a preferred method to prepare the composite granules, for example using intermesh, counter-rotating or co-rotating twin-screw extruders with appropriate proportions of some or all of the components. The temperature for the compounding depends on the particular components used, particularly on the melting temperature of the thermoplastic polymer(s), and can for example range from about 150° C. to about 190° C. for many common thermoplastic polymers. Materials in the formulation, including plastics, fibers, and additives, are metered and fed to the extruder. The extrudates are quenched, for example in a cold water bath or by air-cooling, and are then pelletized or ground into granules of various sizes. Alternatively, the blends can be made with high speed kinetic mixers (e.g., mixers made by LEX Technologies, Brampton, Ontario, Canada and supplied by EcoLEX, Inc of Burlington, Ontario), followed by grinding to produce desired particle sizes. Preferred particle sizes include those between 6 mesh and 35 mesh (i.e., between 0.5 mm and 3.4 mm).

Optionally, the infill can additionally comprise other particles that are mixed in with the composites described herein, but that may or may not themselves be part of a composite. Such additional infill particles can include, for example, one or more particles selected from the group consisting of walnut shell fragments, coconut shell fragments, cypress wood flakes, cedar wood flakes, other wood flakes, ground composites of wood and plastic, ground composites of other natural cellulosic fibers and plastic, ground particleboard of wood and plastic, ground particleboard of other natural cellulosic fibers and plastic.

In one embodiment of the novel system, the thermoplastic polymer of the composite comprises high-density polyethylene, low-density polyethylene or both; the cellulosic fibers comprise pine wood shavings, pine wood sawdust, or both; the composite particles additionally comprise between 5% and 30% calcium carbonate by mass; the composite particles additionally comprise between 0.5% and 2% maleated polyethylene by mass; the composite particles additionally comprise between 0.5% and 2% by mass of an ultraviolet absorber; and the composite particles additionally comprise between 0.5% and 2% by mass of zinc borate. In another embodiment, the composite particles additionally comprise between 5% and 20% by mass of magnesium hydroxide as a flame retardant.

MODES FOR CARRYING OUT THE INVENTION

To facilitate a better understanding of the present invention, the following examples of specific embodiments are given. These examples should not be read to limit the scope of the invention. Unless otherwise stated, all percentages given in the specification and claims are percentages by weight (or mass).

Example 1. Thermoplastic Cellulosic-Fiber Granule Composite One (TCFG1)

Thermoplastic cellulosic-fiber granule composite one (TCFG1) was created with recycled film-grade low-density polyethylene (38%), 20-mesh wood pine fiber from American Wood Fiber Company, Madison, Wis. (40%), precipitated calcium carbonate with a mean particle diameter of about 20 microns (20%), and 2% maleated polyethylene as a bonding agent. The components were compounded with a counter-rotating, CTSE-V/MARKII™ twin-screw extruder (C.W. Brabender Instruments Inc., South Hackensack, N.J., USA) at a screw rotation speed of 50 rpm at a temperature profile of 140°, 160°, 170°, and 170° C. The extrudates were quenched in a cold water bath and were then granulated into particulate form.

Example 2. Thermoplastic Cellulosic-Fiber Granule Composite Two (TCFG2)

Thermoplastic cellulosic-fiber granule composite two (TCFG2) was created with mixed recycled high density polyethylene (25%), 8-mesh wood pine fiber from American Wood Fiber Company, Madison, Wis. (50%), calcium carbonate (23%), and 2% maleated polyethylene as a bonding agent. The materials were compounded at selected proportions through a Micro-27™ extruder from American Leistritz Extruder Corporation (Somerville, N.J., USA) with a temperature profile of 130-150-160-170-180-180-180-180-180-180-180° C. and a screw rotation speed of 100 rpm. The extrudates were cooled in air and then granulated into particulate form.

Example 3. Thermoplastic Cellulosic-Fiber Granule Composite Three (TCFG3)

Thermoplastic cellulosic-fiber granule composite three (TCFG3) was created with virgin high density polyethylene (39%), 10-mesh wood pine fiber from American Wood Fiber Company, Madison, Wis. (50%), zinc stearate-based lubricant (6%), maleated polyethylene as a bonding agent (4%), and zinc borate (1%). The lubricant was used to enhance the flow of the polymer-fiber mixture to better shape the composite. Zinc borate was used as a biocide to inhibit mold, decay, and termite attacks. The materials were compounded at selected proportions with a Micro-27™ extruder from American Leistritz Extruder Corporation (Somerville, N.J., USA) with a temperature profile of 130-150-160-170-180-180-180-180-180-180° C. and a screw rotation speed of 100 rpm. The extrudates were cooled in air and then granulated into pellet form.

Example 4. Thermoplastic Cellulosic-Fiber Granule Composite Four (TCFG4)

Thermoplastic cellulosic-fiber granule composite four (TCFG4) was created with mixed recycled high density polyethylene (25%), wood shavings from a wood planer (50%), and calcium carbonate (25%). The materials were compounded at selected proportions with a commercial scale, twin-screw extrusion machine at 180° C. and a screw rotation speed of 100 rpm. The extrudates were cooled in air and then granulated into particulate form.

Example 5. Thermoplastic Cellulosic-Fiber Granule Composite Five (TCFG5)

Thermoplastic cellulosic-fiber granule composite five (TCFG5) was created with virgin high density polyethylene (30%), wood fiber (55%), maleated polyethylene (MAPE) (2%), zinc stearate lubricant (5%), talc (5%), a UV absorber (Tinuvin™ 783) (2%), and colorant (1%). The materials were compounded at selected proportions through a commercial scale twin-screw extrusion machine at 180° C. and a screw rotation speed of 100 rpm. The composite was extruded into air, and then granulated into particles.

TCFG5 is a preferred formulation. Its cost could perhaps be reduced somewhat by lowering the amount of MAPE or UV absorber, or by increasing the amount of talc in the formulation, or by adding zinc borate. These modifications will be tested to find an optimal formulation that retains the beneficial properties of TCFG5 while lowering the overall cost.

Example 6. Thermoplastic Cellulosic-Fiber Granule Composite Six (TCFG6)

Thermoplastic cellulosic-fiber granule composite six (TCFG6) was created with virgin high density polyethylene (31.6%), wood fiber (50.5%), maleated polyethylene (3.2%), zinc stearate lubricant (4.7%), and magnesium hydroxide (flame retardant) (10%). The materials were compounded in the selected proportions with a commercial-scale, twin-screw extrusion machine at 180° C. and a screw rotation speed of 100 rpm. The composite was extruded into air, and then granulated into particles.

Example 7. Thermoplastic Cellulosic-Fiber Granule Composite Seven (TCFG7)

sample was taken from a new, commercially-prepared, high-quality, 25-year-warranty, wood-plastic composite (CWPC) blend. The commercially-prepared composite was estimated (based both on analysis in our laboratory and on communications with the manufacturer) to contain about 30% plastics (10% virgin HDPE and 20% recycled LDPE), 54% wood fiber, 10% talc, and about 6% other processing additives such as maleated polyethylene (MAPE), zinc stearate lubricant, UV absorber, and colorant. The CWPC board was processed into smaller pieces and then granulated to pass a US 8-mesh screen (2.4 mm). The particles were screened using a US 35 mesh screen (0.5 mm) to remove fines. The particles passing the 8-mesh screen and retained by the 35-mesh screen were used as infill materials.

Many high-quality commercial wood-plastic composites have generally similar compositions, although the details vary from one to another. Many recycled commercial wood-plastic composite boards may therefore be used in preparing the infills of this invention, with reprocessing and additional additives incorporated as needed to provide the desired material properties and uniformity. For example, some commercial composite boards do not include a coupling agent; they may or may not incorporate a biocide such as zinc borate. Commercial composite boards are typically formed under high extrusion pressure, leading to densities greater than 1 g/cm$^3$. When purpose-made infill materials are made at lower extrusion pressures, unless countervailing steps are taken the density can end up below 1 g/cm$^3$; and in such a case the formulation (e.g., higher density mineral additives) or extrusion conditions (e.g., higher pressure) can be modified to achieve the desired density above 1 g/cm$^3$.

Examples 8-15. Characterization of Composite Properties

The properties of the composites of Examples 1-7 were tested.

Two 40-gram samples of each of the composites TCFG1, TCFG2, TCFG4, TCFG5, and CWPC were compression-molded at 170° C. to produce two plates of each of the composites, each measuring approximately 100 mm×152 mm×5 mm. Test samples for measuring mechanical properties of the composites were machined from these plates.

Granules of TCFG3 were extruded through a Micro-27™ extruder (American Leistritz Extruder Corporation, Somerville, N.J., USA) with a temperature profile of 130-150-160-170-180-180-180-180-180-180-180° C. and a screw rotation speed of 60 rpm to make an extruded composite with cross-sectional dimensions of 50 mm×12.5 mm, from which test samples were machined for measuring mechanical properties.

Flexural properties of the composite samples were measured according to ASTM D790-03 using an INSTRON™ 5582 Testing Machine (Instron Co., Grove City, Pa., USA). A TINIUS™ 92T impact tester (Testing Machine Company, Horsham, Pa.) was used for the Izod impact test. All samples were notched at the center point of one long side according to ASTM D256. Material rebound after 20% compression was measured using an INSTRON™ 5582 machine and a digital caliper, by determining sample thickness both before and after three compression loads had been applied to each of the test samples.

Fire performance was measured with a Stanton Redcroft™ cone calorimeter (Fire Testing Technology Limited, London, UK) according to the ISO 5660-1 standard. The test sample was placed on a piece of aluminum foil inside a corundum crucible. The crucible was mounted horizontally on a loader, and then exposed to 50 kW/m² heat radiation, corresponding to a temperature of about 780° C. on the upper surface of the test sample.

Fungal decay susceptibility was tested for selected composite formulations in accordance with the American Wood Protection Association (AWPA) Standard Method of Testing Wood Preservatives by Laboratory Soil-Block Cultures (E10-12). The brown rot fungus used in these tests was *Gloeophylum trabeum*. Future tests will also be conducted with the brown rot fungus *Postia placenta*, and with the white rot fungi *Trametes versicolor* and *Irpex lacteus*. The *G. trabeum* brown rot decay test ran for 12 weeks. Future tests for white rot decay will run for 24 weeks. Samples were sterilized by gamma irradiation prior to testing. Sample weight loss was measured.

Resistance to Formosan subterranean termites was measured for selected composite formulations in accordance with the AWPA E1-13 Standard Method for Laboratory Evaluation to Determine Resistance to Subterranean Termites, single choice method. Test samples measuring 25 mm×25 mm×5 mm, or 25 mm×25 mm×12.5 mm were used for the composites; and test samples measuring 25 mm×25 mm×6 mm were used for southern pine controls. Weight loss and damage ratings were assessed after a 28-day exposure test.

Accelerated artificial UV weathering tests were conducted in a Ci300+™ xenon arc-type Weatherometer (Atlas Electric Devices, Wauconda) according to the ASTM D2565-99 (2008) standard. The samples were rotated at 1 rpm around a spray nozzle and a UV source, as specified in the ASTM standard. The weathering times were 500, 1000, and 2000 h. Sample color change and strength loss were measured.

Surface hardness tests were conducted on artificial turf filled with the composite infill materials, based on ASTM F3550-A. A commercial artificial grass turf was used with 64 mm-long grass, at an infill depth of 38 mm with the novel composite particles. Based on these test results, surface hardness Gmax values were obtained.

Table 1 lists selected properties for various composites. The data showed that the composites were strong and durable, providing sufficient strength, impact resistance, compressibility, fire resistance, and biological resistance. The surface hardness data (Gmax value) showed that the infill systems led to acceptable surface hardness for balancing the safety and performance—all based on comparison to typical industrial standards (not shown).

TABLE 1

| Sample | Base Polymer | Density (g/cm³) | Young's Modulus (GPa) | Bending Strength (MPa) | Impact Strength (kJ/m²) | Rebound Rate[1] (%) | Gmax Value[2] |
|---|---|---|---|---|---|---|---|
| TCFG1 | Recycled-LOPE | 1.20 | 1.99 | 21.01 | 3.53 | 19.9 | 95 |
| TCFG2 | Recycled-Mixed-HDPE | 1.25 | 1.45 | 14.15 | 2.73 | 23.3 | 113 |
| TCFG3[3] | Virgin HDPE | 1.19 | 3.32 | 32.25 | 3.45 | 25.6 | 135 |
| TCFG4 | Recycled-Mixed-HDPE | 1.13 | 1.39 | 29.80 | 3.05 | 21.8 | 121 |
| TCFG5[4] | Virgin HDPE | 1.15 | 4.6 | 30.7 | 3.06 | 30.0 | 146 |
| TCFG6[5] | Virgin HDPE | 1.18 | 4.30 | 30.55 | 2.90 | 28.9 | 164 |
| CWPC | Recycled HDPE | 1.15 | 2.50 | 27.8 | 2.20 | 20.0 | 138 |

[1]Rebound rate after 20% Compression.
[2]Surface hardness test based on ASTM F3550-A, on a commercial artificial grass turf with 64 mm-long grass and 38 mm infill depth.
[3]Additional data not otherwise presented in Table 1 for the TCFG3 sample: Improved composite resistance to both termite and decay fungi was seen. Weight loss from decay with brown rot *G. trabeum* for TCFG3 was 0.74%. Weight loss from decay with brown rot *G. trabeum* for control was 32.3%. Mean weight loss from Formosan subterranean termites was 29.7% for the untreated wood controls. Mean weight loss from Formosan subterranean termites was 0.55% for TCFG3 samples.
[4]Additional data not otherwise presented in Table 1 for the TCFG5 sample: Improved composite color change index was seen, showing better UV resistance for TCFG5 samples, with fewer surface cracks. Incorporating a UV absorber (2.0% by weight) led to a reduced color change index (ΔE): 22.5 (control without UV agent) versus 18.0 (composition with UV agent) after 2000 hour UV exposure. These results showed enhanced color stabilization. There were substantially fewer surface cracks in the samples with the UV agent.
[5]Additional data not otherwise presented in Table 1 for the TCFG6 sample: Improved flame retardance was seen. TCFG6 samples had a reduced peak of heat release rate (pHRR: control sample = 371.48 kW/m² vs. treated sample = 284.88 kW/m²), lower total heat release (THR: control sample = 166.85 kW/m² vs. treated sample = 153.13 kW/m2), similar total smoke production (TSP: control sample = 11.03 m²/m² vs. treated sample = 11.60 m²/m²), and lower mass loss (ML: control sample = 55.64% vs treated sample = 50.07%) as compared to controls.

Three selected composite formulations were granulated to pass through a US 8-mesh circular screen. Diameters of the granulated materials were measured with a digital caliper. Mean particle diameter and standard deviation for each sample set were determined from measured particle diameters. Ranges of particle size distribution were determined for each group. The data are shown in Table 2. Most particles were "approximately spherical," with an aspect ratio less than two.

TABLE 2

Average particle size and particle size distributions for three formulations

| Formulation | Average Mean (mm) | Standard deviation (mm) | Particle size distribution [a] | | | | |
|---|---|---|---|---|---|---|---|
| | | | 10% (mm) | 30% (mm) | 50% (mm) | 70% (mm) | 90% (mm) |
| TCFG4 | 2.05 | 0.37 | <1.63 | <1.82 | <1.95 | <2.28 | <2.60 |
| TCFG5 | 2.37 | 0.66 | <1.59 | <1.95 | <2.35 | <2.66 | <3.20 |
| TCFG6 | 1.98 | 0.46 | <1.40 | <1.75 | <1.95 | <2.20 | <2.43 |

[a] Particle sizes were measured and counted by laser. Percentages are by particle numbers. For example, with a hypothetical sample size of 1000 particles of TCFG4, 10% of the total number (or 100 particles) consisted of the smallest particles, those having a length (longest dimension) less than 1.63 mm, 30% (or 300 particles) had a length less than 1.82 mm, 50% (or 500 particles) had a length less than 1.95 mm in diameter; etc. . . . and 10% (or 100 particles) had a length greater than 2.60 mm.

Example 16. Slender Composite Particles

A lab granulator was used to make slender particles from TCFG5, using a metal screen with rectangular openings. The dimensions of the resulting particles were measured with a digital caliper. The particles had lengths varying from about 5 to 20 mm, widths varying from about 1 to 5 mm, and thicknesses from about 0.1 to 1.5 mm. The aspect ratio (ratio of the length of the longest side to the length of the shortest side) varied from about 5 to 70.

The complete disclosures of all references cited in this specification are hereby incorporated by reference, as are the complete disclosures of the present inventor's patent application publications US 2014/0374110, US 2012/0108472, and US 2011/0263758, and also the complete disclosure of priority application 62/175,474. In the event of an otherwise irreconcilable conflict, however, the present specification shall control.

What is claimed:

1. An artificial turf system, wherein said system comprises: polymeric, upright turf fibers resembling grass; and infill interspersed among said turf fibers; wherein at least some of said infill comprises synthetic composite particles wherein: said synthetic composite particles comprise a thermoplastic polymer, cellulosic fibers, calcium carbonate, maleated polyethylene, an ultraviolet absorber, and zinc borate; said thermoplastic polymer is between about 10% and about 90% of said synthetic composite particles by mass; said thermoplastic polymer comprises high-density polyethylene, low-density polyethylene or both; said cellulosic fibers are between about 10% and about 80% of said synthetic composite particles by mass; said cellulosic fibers comprise pine wood shavings, pine wood sawdust, or both; said calcium carbonate is between 5% and 30% of said synthetic composite particles by mass; said maleated polyethylene is between 0.5% and 2% of said synthetic composite particles by mass; said ultraviolet absorber is between 0.5% and 2% of said synthetic composite particles by mass; said zinc borate is between 0.5% and 2% of said synthetic composite particles by mass; said thermoplastic polymer is a matrix that binds together the other components of said synthetic particles into a composite material; and the density of said synthetic composite particles is greater than 1.0 g/cm$^3$.

2. The system of claim 1, wherein said thermoplastic polymer additionally comprises one or more polymers selected from the group consisting of acrylonitrile butadiene styrene, polymethylmethacrylate, acrylonitrile, polytetrafluoroethylene, polyvinylidene fluoride, nylon 6, nylon 66, polycarbonate, polybutylene terephthalate, polyethylene terephthalate, polyetheretherketone, polyetherimide, polyimide, polyphenylene oxide, polyphenylene sulfide, polypropylene, polystyrene, polysulfone, polyethersulfone, polyvinyl chloride, a starch-based polymer, polylactic acid, poly-3-hydroxybutyrate, polyamide 11, and bio-derived polyethylene.

3. The system of claim 1, wherein said synthetic composite particles additionally comprise one or more fibers, particles, or flakes selected from the group consisting of softwoods other than pine, maple, oak, other hardwoods, bamboo, rattan, rice straw, wheat straw, rice husk, bagasse, cotton stalk, jute, hemp, flax, kenaf, milkweed, grass, banana tree, coconuts, walnut shells, pecan shells, other tree nut shells, and peanut shells.

4. The system of claim 1, wherein said synthetic composite particles additionally comprise between 0.1% and 10% by mass of a biocide other than zinc borate.

5. The system of claim 4, wherein said biocide comprises one or more compounds or elements selected from the group consisting of calcium borate; boric acid; copper; zinc; and silver.

6. The system of claim 1, wherein said synthetic composite particles additionally comprise between 1% and 50% by mass of a fire retardant other than zinc borate.

7. The system of claim 6, wherein said fire retardant comprises one or more compounds selected from the group consisting of aluminum trihydroxide, magnesium dihydroxide, ammonium polyphosphate, antimony trioxide; silicon dioxide, silsesquioxanes, silicon nanoparticles, montmorillonite clays, other silicon-containing clays, triphenyl phosphate, halogenated organophosphorus compounds, other organophosphorus compounds, ammonium polyphosphate, bromo-organic compounds, chloro-organic compounds, fluoro-organic compounds, melamines, carbon nanotubes, alumino-silicates, boroxiloxanes, organoclays, zinc chloride, expandable flake graphite intercalations, ammonium borate, ammonium sulphate, ammonium chloride, boric acid, and sodium borate.

8. The system of claim 1, wherein said synthetic composite particles additionally comprise between 0.1% and 20% by mass of a bonding agent.

9. The system of claim 8, wherein said bonding agent comprises one or more compounds selected from the group consisting of stearic acid, organo-titanates, maleated ethylenes, maleic anhydride, styrene/ethylene/butylene/styrene block copolymer, ethylene/propylene/diene terpolymer, ethylene/octene copolymer, ethylene/methyl acrylate copolymer, ethylene/butyl acrylate/glycidyl methacrylate copolymer, poly(ethylene-co-methacrylic acid), and maleated ethylene/propylene elastomer.

10. The system of claim 1, wherein said synthetic composite particles additionally comprise one or more compounds or compositions selected from the group consisting of mica, talc, barite, and ceramics.

11. The system of claim 1, wherein said calcium carbonate comprises oyster shell.

12. The system of claim 1, wherein said synthetic composite particles additionally comprise between 5% and 20% by mass of magnesium hydroxide.

13. The system of claim 1, wherein said synthetic composite particles are between 6 mesh and 35 mesh (i.e., between 0.5 mm and 3.4 mm).

14. The system of claim 1, wherein said infill additionally comprises particles selected from the group consisting of walnut shell fragments, coconut shell fragments, cypress wood flakes, cedar wood flakes, other wood flakes, ground composites of wood and plastic, ground composites of other natural cellulosic fibers and plastic, ground particleboard of wood and plastic, ground particleboard of other natural cellulosic fibers and plastic.

\* \* \* \* \*